United States Patent [19]
Hoshino et al.

[11] Patent Number: 5,954,266
[45] Date of Patent: Sep. 21, 1999

[54] HEATING APPARATUS FOR VEHICLE

[75] Inventors: Tatsuyuki Hoshino; Takashi Ban; Hidefumi Mori; Kiyoshi Yagi; Tatsuya Hirose; Shintaro Miura, all of Kariya, Japan

[73] Assignee: Kabushiki Kaisha Toyoda Jidoshokki Seisakusho, Kariya, Japan

[21] Appl. No.: 08/955,054

[22] Filed: Oct. 21, 1997

[30] Foreign Application Priority Data

Oct. 21, 1996 [JP] Japan .................................. 8-278299

[51] Int. Cl.⁶ ........................................................ B60H 1/02
[52] U.S. Cl. ................................... 237/12.3 R; 126/247; 122/26
[58] Field of Search .............................. 122/26; 126/247; 237/12.3 B, 12.3 R

[56] References Cited

U.S. PATENT DOCUMENTS

| | | | |
|---|---|---|---|
| 4,974,778 | 12/1990 | Bertling | 237/12.3 R |
| 4,993,377 | 2/1991 | Itakura | 237/12.3 R |
| 5,573,184 | 11/1996 | Martin | 237/12.3 R |

*Primary Examiner*—Henry A. Bennett
*Assistant Examiner*—Derek S. Boles
*Attorney, Agent, or Firm*—Burgess, Ryan & Wayne

[57] ABSTRACT

A heating apparatus for a vehicle with a simplified piping structure in a fluid pressure operating system, to a heat exchanger while preventing a pulsation of the operating fluid in the system from being directly transmitted to a cabin, thereby suppressing an occurrence of a noise in the cabin. A fluid pressure operating system includes an oil pump 12 rotated by an engine 21 and an actuator 20 operated by the operating fluid issued from the oil pump 12. A heat exchanger 39 is arranged between an outlet of the oil pump 12 and the actuator 20. Heat generated at the oil pump 12 in the fluid pressure operating system 11 is passed to the engine cooling water at the heat emitter and is used for heating the cabin.

10 Claims, 5 Drawing Sheets

HEATING APPARATUS FOR VEHICLE

BACKGROUND OF THE INVENTION

1. Field of the Invention

The present invention relates to a heating apparatus for a passenger vehicle.

2. Description of Related Art

In a passenger vehicle a recirculating system of an operating fluid, such as an oil is provided. Connected to the pressure fluid recirculating system are an oil pump as well as actuators such as fluid cylinders for operating various devices for the vehicle, such as a power steering device. A rotating movement of a crankshaft of an internal combustion engine of the vehicle is transmitted to the oil pump, so that the oil as the operating fluid is discharged from the oil pump and is fed to the operating cylinder as an actuator. As a result, a designated function of the actuator is obtained. In this type of system, the operation of the oil causes heat to be generated, thereby increasing the temperature of the operating fluid (oil) discharged from the oil pump.

In view of the above, an oil cooler is connected to the pressure fluid recirculating system, so that the operating fluid is cooled to prevent the temperature of the oil from exceeding a predetermined value. This means that the heat of the operating fluid is wasted. In other words, in the prior art, the heat generated by the operating fluid was not effectively used.

In view of the above, Japanese Unexamined Patent Publication (Kokai) No. 59-102611 proposes a heating device for an industrial vehicle, where heat as generated by the operating fluid is utilized for heating a cabin of the vehicle. Namely, in the heating device of this patent, a heat exchanger is arranged in a passageway for the operating fluid between an actuator (operating cylinder) and an oil pump, while the heat exchanger is located in a cabin so that the heat exchanger contacts air to be recirculated in the cabin. Thus, at the heat exchanger, heat exchange occurs between the operating fluid and the air recirculated in the cabin, thereby heating the cabin.

In the prior art heating device, the heat exchanger is arranged in the fluid pressure operating system at a location between the actuator and the inlet side of the oil pump. As a result, the operating oil discharged from the oil pump is first fed to the actuator and then to the heat exchanger. In other words, the supply of the operating oil to the heat exchanger occurs after the operating oil leaves the actuator. As a result, although it is possible to prevent the temperature of the operating oil from increasing to a value exceeding a predetermined value, the operating oil with an increased temperature from the oil pump is fed to the actuator, resulting in a reduction of the durability of the actuator.

SUMMARY OF THE INVENTION

An object of the present invention is to provide a heating apparatus for a vehicle, capable of overcoming the above mentioned drawbacks encountered in the prior art.

Another object of the present invention is to provide a heating apparatus for a vehicle with a simplified fluid pressure system structure with respect to a heat exchanger.

Still another object of the present invention is to provide a heating device for a vehicle capable of preventing pulsations in the operating fluid due to the operation of the oil pump from being transmitted to the cabin by way of the fluid pressure system, thereby reducing vibrations in the vehicle.

Still another object of the present invention is to provide a heating apparatus for a vehicle capable of effectively using heat of the operating fluid from the oil pump prior to supplying the operating fluid to an actuator.

According to the invention, a heating apparatus is provided, which comprises:

an internal combustion engine;

a fluid pressure operating system including an oil pump operated by the engine for discharging an operating fluid and an actuator for receiving the operating fluid from the oil pump for operating said actuator;

an engine cooling water recirculating passageway for recirculation of the engine cooling water;

a radiator arranged in said engine cooling water recirculating passageway for removing heat from the engine cooling water;

a passageway branched from said engine cooling water recirculating passageway so as to by-pass the radiator;

a heater core arranged in said branched passageway so that heat exchange occurs between the engine cooling water and an air flow to be discharged into a cabin of the vehicle, and;

a heat exchanger arranged in the operating fluid recirculating passageway at a location between an outlet of said oil pump and said actuator so that heat exchange occurs between the operating fluid and the engine cooling water, thereby causing the heat generated in the oeprating fluid to be transmitted to the engine cooling water and to be used for heating the cabin.

According to this construction the heat exchanger is arranged outside the cabin, resulting in a simplication of [a] piping construction of the system to the heat exchanger. Furthermore, pulsation of the operating fluid as generated by a compression operation of the oil pump is prevented from being directly transmitted to the cabin via the fluid pressure operating system, thereby reducing noise in the cabin. Furthermore, since the heat exchanger is located in the fluid pressure operating system at a location between the outlet of the oil pump and the actuator, the operating fluid discharged from the oil pump is subjected to cooling at the heat exchanger prior to the supply to the actuator. Thus, the actuator can be operated in a cooler condition, thereby prolonging the service life of the actuator.

Preferably, a fixed throttle is arranged in said fluid pressure system at a location between the outlet side of the oil pump and said actuator, said heat exchanger being arranged between the outlet of the oil pump and the fixed throttle. As a result of this structure, a reduction of the temperature of the operating fluid under adiabatic expansion when the operating fluid is passed through the fixed throttle does not occur before the operating fluid passes through the heat exchanger, which would otherwise occur when the heat exchanger is arranged at a location downstream from the fixed throttle. Thus, increased heat exchange between the operating fluid and the cooling water is obtained.

Preferably, a thermostat valve is arranged in the recirculating passageway for blocking the flow of the engine cooling water to the radiator when the temperature of the cooling water is lower than a predetermined value. An on-off valve is arranged in said branched passageway for selectively opening or closing the branched passageway to control the flow of cooling water in accordance with the heating requirement of the cabin, and wherein said heat exchanger is arranged so as to by-pass the recirculating passageway between the branching point of the branched passageway and the radiator. By this structure, in accordance with factors such as the temperature of the engine cooling water and the heating requirement of the cabin, a switching of the recirculating passageway occurs. Thus, effective heating of the cabin is obtained, while keeping a desired cooling capacity of the cooling water recirculating passageway.

Preferably, said heat exchanger is arranged in said branched passageway at an inlet of said heater core. Thus, when heating is required due to a low temperature of the engine cooling water, the flow of the air to be discharged to the cabin is more effectively heated at a heater core which is arranged in series with respect to the heat exchanger, thereby realizing a quick heating operation.

Furthermore, the engine cooling water is returned to the engine while keeping the remaining heat generated in the heat exchange at the heater core, thereby speeding up a warming up operation of the engine, thereby speeding up an increase in the temperature of the engine cooling water and speeding up the starting of the heating of the cabin.

Preferably, said heat exchanger is arranged in said recirculating passageway at a location adjacent to the outlet of the engine cooling water from the engine. As a result, a quick heating of the cabin is realized when heating of the cabin is required when the temperature of the engine cooling water is low, and a warming up performance of the engine is improved. Furthermore, when the engine cooling water is recirculated to the radiator due to an opened condition of the thermostat valve, the operating fluid is subjected to cooling prior to the supply to the actuator, thereby preventing the actuator from being subjected to thermally severe conditions, resulting in an increase in the durability of the actuator.

Preferably, said heat exchanger is arranged in the recirculating passageway at a location adjacent to the inlet of the engine cooling water to the engine. As a result of this structure, the engine cooling water of a low temperature is first subjected to a heat exchange with the operating fluid in the fluid pressure system and, then, the engine cooling water at an increased temperature is returned to the engine. Thus, an effective warming up of the engine is realized, thereby quickly increasing the temperature of the engine cooling water, thereby speeding up the heating operation of the cabin. Finally, in a recirculated condition of the engine cooling water due to the opened position of the thermostat, the operating fluid in the fluid pressure system is cooled prior to being fed to the actuator, thereby preventing the actuator from being subjected to thermally severe conditions, resulting in an increase in the durability of the actuator.

Preferably, a variable orifice is arranged at the inlet or the outlet of the operating fluid of the heat exchanger. As a result of this structure, under a condition of a low discharged amount and a low pressure of the operating fluid from the oil pump due to a low engine rotational speed, the degree of the opening of the variable orifice is reduced, so that the discharged pressure of the operating fluid is increased. Thus, an increase of the temperature of the engine cooling water via the heat exchanger is obtained, thereby enhancing the heating efficiency.

Preferably, a temperature sensor is provided for detecting the temperature of the engine cooling water and a controlling means for controlling the degree of the opening of said variable orifice. As a result of this structure, when the temperature of the engine cooling water is high, which makes further heating unnecessary, an adjustment of the variable orifice is done so that the degree of the opening of the variable orifice is increased. Thus, an excessive increase in the temperature of the engine cooling water is prevented, and the oil pump is prevented from being subjected to an unnecessary load.

Preferably, a means is provided for allowing, as a pilot pressure, the pressure at the inlet of the actuator to be introduced into the variable orifice. As a result of this structure, during an operation of the actuator, an adjustment of the variable orifice is done so that the degree of the opening is increased, thereby preventing the oil pump pressure from being rapidly increased.

Preferably, to the body of the oil pump, the fixed throttle portion, the flow control valve and the pressure control valve are integrally arranged. Thus, a compact structure of a portion around the oil pump is realized, while piping between the parts is eliminated, which makes the system to be suitable for an arrangement in a limited space in an engine compartment.

BRIEF EXPLANATION OF ATTACHED DRAWINGS

DESCRIPTION OF PREFERRED EMBODIMENTS

First Embodiment

Now, a first embodiment of the present invention will be explained with reference to FIGS. 1 to 4.

Figure 1:
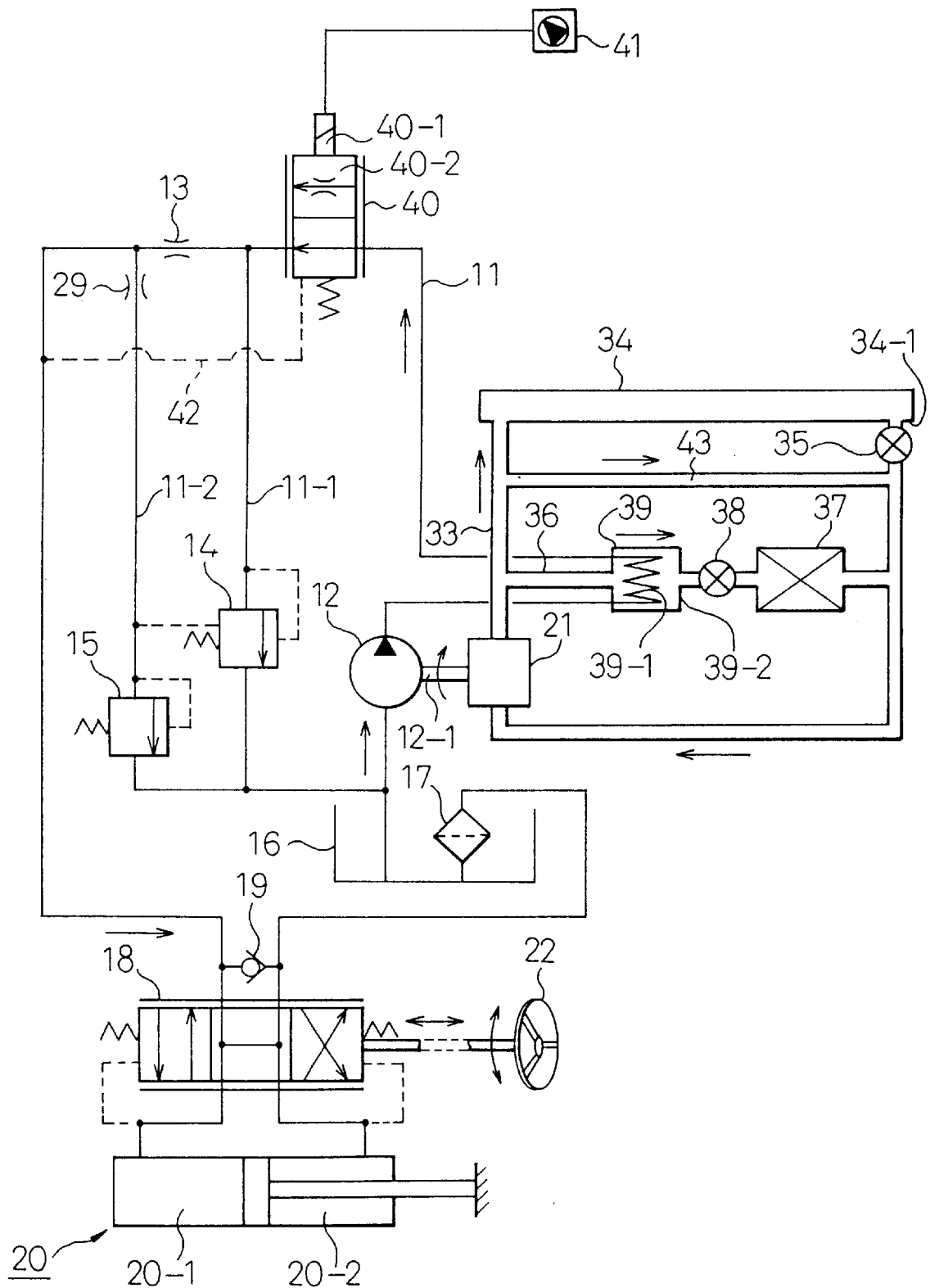
FIG. 1 is a schematic view of a system according to the first embodiment of the present invention.

As shown in FIG. 1, a reference numeral 11 denotes an operating fluid recirculating system, in which an oil pump 12 for the operating fluid (oil) a metering orifice 13 for restricting flow of the operating fluid, a flow control valve 14, for controlling flow of the operating fluid, a pressure control valve 15 for controlling the pressure of the operating fluid, an oil tank 16 for storage of the operating fluid and an oil filter 17 for purifying the operating fluid are arranged.

Also arranged in the operating fluid recirculating system 11 are a control valve 18, a check valve 19 and a fluid cylinder 20 (power cylinder) as the actuator in a power steering system. The oil pump 12 has a rotating shaft 12-1, which is in a driven connection with a crankshaft of an internal combustion engine 21, so that a rotating movement from the crankshaft of engine 21 is transmitted to the rotating shaft 12-1 of the oil pump 12, so that the operating fluid from the pump 12 is discharged into the fluid pressure system 11. A metering orifice 13 is arranged in the fluid pressure system 11 at a location downstream from the oil pump 12 and functions to control a predetermined value of the flow rate of the operating fluid. A conduit 11-1 is provided for connecting the system 11 at a location upstream from the metering orifice 13 with the oil tank 16. The flow control valve 14 is arranged in the conduit 11-1 and operates so that the required amount of the operating fluid is directed to the metering orifice 13, while an excess of the amount of oil is returned to the oil tank 16 via the conduit 11-1. A further conduit 11-2 is provided for connecting the system 11 at a location downstream from the metering orifice 13 with the oil tank 16. The pressure control valve 15 ia arranged is arranged in the conduit 11-2 and functions to control the pressure of the operating fluid when an excessive load is generated in the operating fluid system, thereby preventing the parts comprising the system from being damaged.

The control valve 18 is connected to a steering wheel 22 of the vehicle and is controlled in accordance with the steering operation of the steering wheel 22. Namely, in a well known manner, the control valve 18 has a valve member which is connected to the steering wheel 22 via a rack and pinion mechanism (not shown). In accordance with a steering direction, the operating fluid is introduced into a first chamber 20-1 or a second chamber 20-2 of the cylinder 20, while, from the opposite chamber 20-2 or 20-1, the operating fluid is discharged. Furthermore, introduction of the operating fluid into the cylinder 20 is done in accordance with the steering speed. As a result, a desired steering force multiplication operation is obtained in accordance with the direction and the speed of the steering operation.

Figure 2:
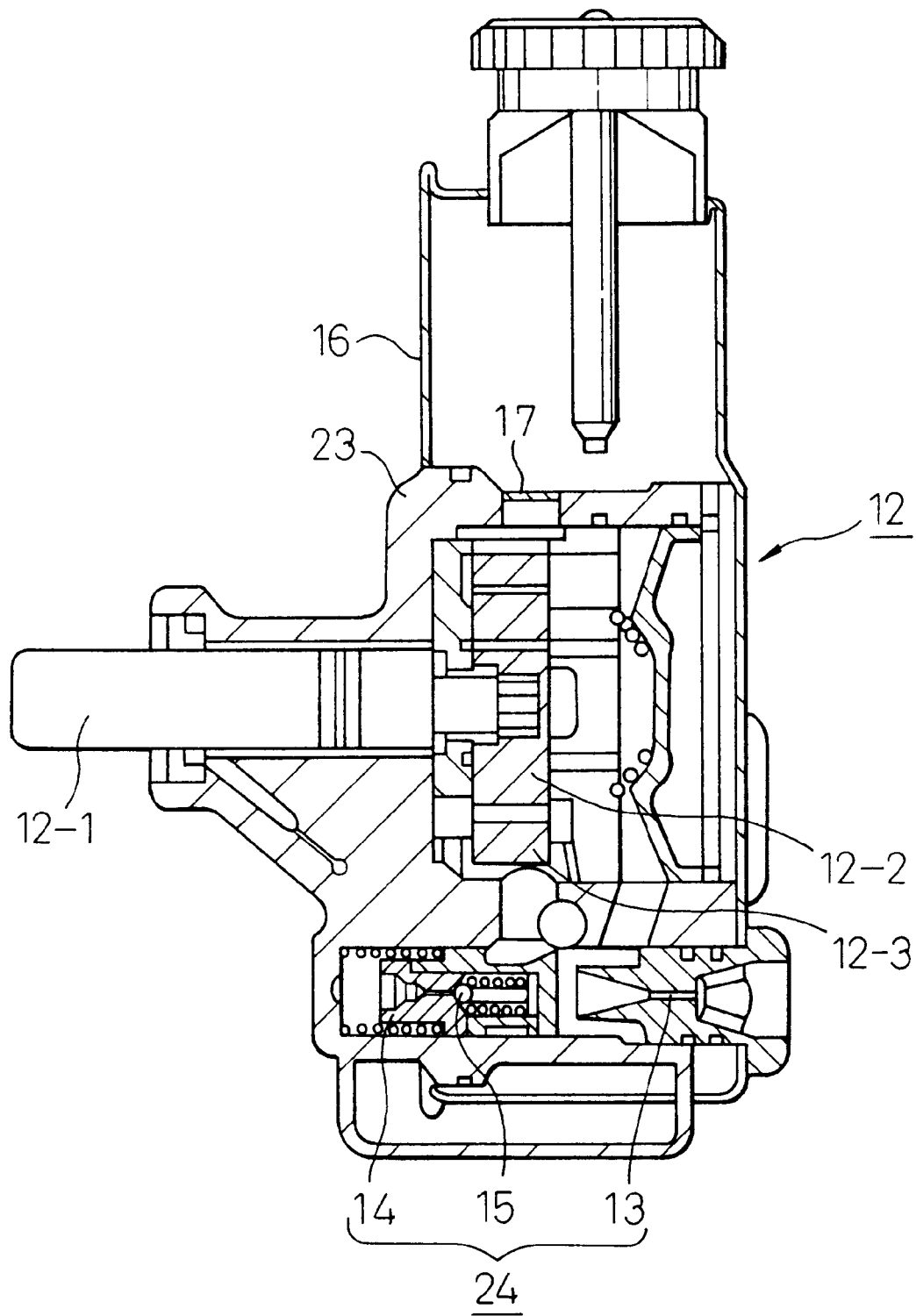
FIG. 2 is a cross sectional view of the oil pump in FIG. 1.

As shown in FIG. 2, the oil pump 12 is, at an end of the rotating shaft 12-1, constructed as a gear pump having an inner rotating gear 12-2 and a stationary gear 12-3, between which gear members 12-2 and 12-3, compression chambers are formed in a well known manner. The pump 12 has a housing 23 for enclosing parts 12-2 and 12-3 and for integrating a unit 24 comprising the metering orifice 13, the flow control valve 14 and the pressure control valve 15 as shown in FIG. 1. Furthermore, at the top of the housing 23 of the oil pump 12, the oil tank 16 and the oil filter 17, shown in FIG. 1, are also integrated.

Figure 3:
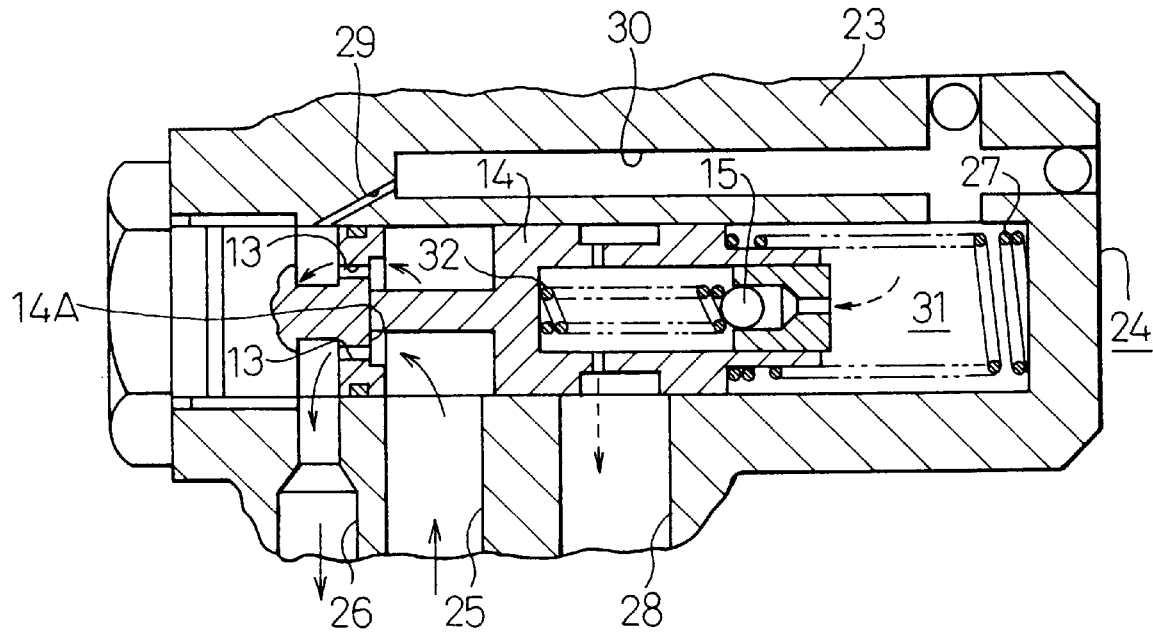
FIG. 3 is a partial enlarged view of the oil pump in FIG. 2, when the engine rotational speed is low.

When the rotating speed of the oil pump 12 is low, due to the fact that engine 21 is in a low speed operation, only a small amount of the operating fluid is directed to the valve unit 24 from the oil pump 12. As a result, as shown in FIG. 3, all of the operating fluid passes through the metering unit 13 and is directed to the feed port 26, as shown by arrows, and is introduced into the power cylinder 20 as shown in FIG. 1. Namely, the force of a spring 27 causes the flow control valve 14 to be moved in a left-handed direction in FIG. 3, so that the valve 14 rests on a seat 14A. As a result, all of the flow from the inlet port 25 connected to the oil pump 12 passes through the metering orifice 13 and is directed to the outlet port 26.

Figure 4:
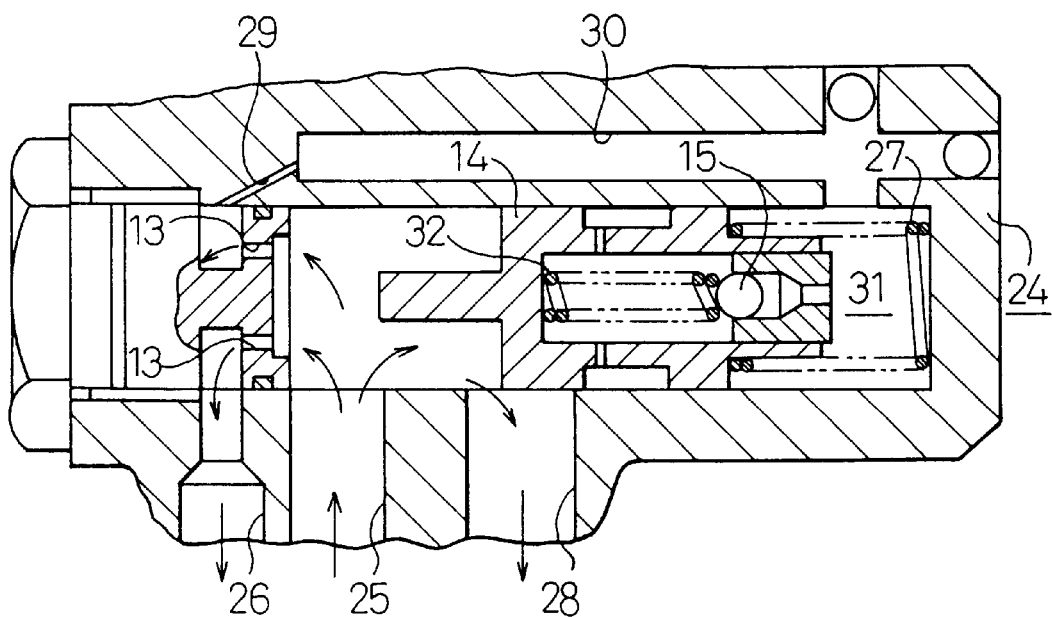
FIG. 4 is the same as FIG. 3 but illustrates when the engine rotational speed is high.

When the rotating speed of the oil pump 12 is high due to the fact that the engine 21 is under a high speed operation, a large flow of the operating fluid is directed to the valve unit 24 from the oil pump 12. In this case, the amount of operating fluid directed to the metering unit 13 must be limited. Namely, as shown in FIG. 4, the flow control valve 14 is moved in the right-hand direction against the force of the spring 27, so that the relief port 28 is opened, thereby allowing the operating fluid to flow into the relief port 28 and be returned to the oil tank 17 as shown by the arrows.

Furthermore, in FIG. 3, a chamber 31 is formed in the housing 23 on one side of the pressure control valve 15 remote from the spring 32. Pressure at a location downstream from the metering orifice 13 is opened to the chamber 31 via an orifice 29 and a passageway 30 in the housing 23. Thus, a pressure of the operating fluid larger than a predetermined value causes the pressure control valve 15 to be moved against the force of the set spring 32. As a result, an amount of the operating fluid is, via the orifice 29 and the passageway 30, directed to the chamber 31 and then to the relief port 28. The operating fluid is returned to the oil tank 16, so that a predetermined pressure of the operating fluid is maintained.

In FIG. 1, the internal combustion engine 21 is of a water cooled type having a cooling water recirculation passageway 33, in which a radiator 34 is arranged. A thermostat 35 is located in the passageway 33 at a location adjacent an outlet 34-1 of the radiator 34. The thermostat 35 is usually in a closed position where recirculation of the engine cooling water via the radiator 34 does not occur. A temperature of the engine cooling water higher than a predetermined value causes the thermostat 35 to be opened, so that recirculation of the engine cooling water via the radiator 34 occurs.

A branch passageway 36 is connected to the passageway 33 so as to by-pass the radiator 34. Arranged in the recirculating passageway 36 are a heater core 37, a water valve 38 and a heat exchanger 39. The heater core 37 is arranged in an air duct (not shown) which is directed to a cabin of the vehicle, so that air flow generated in the air duct by a fan (not shown) contacts the heater core 37, so that heat exchange occurs between the engine cooling water and the air flow in the duct. The air is heated, thereby heating the cabin. The water valve 38 functions as an on-off valve, which is responsive to an on-off operation of a heater switch in the cabin manipulated by a driver or a passenger. Namely, an opened condition of the valve 38 allows the engine cooling water at a high temperature to flow through the heater core 37, thereby executing a heat exchange of the engine cooling water with the air, thereby heating the cabin. Contrary to this, a closed condition of the valve 38 prevents the engine cooling water from flowing through the heater core 37, thereby preventing heating of the cabin.

The heat exchanger 39 is arranged in the engine compartment (not shown) of the vehicle and is located in the engine cooling water recirculating passageway at a location between the outlet of the oil pump 12 and inlet of the power cylinder 20. Specifically, in the embodiment in FIG. 1, the heat exchanger 39 is located in the fluid pressure operating system 11 at a location at the inlet of the metering orifice 13. Furthermore, the heat exchanger 39 is located at the inlet of the heater core 37 in the passageway 36 branching from the first passageway 33. The arrangement of the heat exchanger 39 is such that heat exchange occurs between the engine cooling water in the branch passageway 36 and the operating fluid in the fluid pressure operating system 11. Thus, heat generated in the oil pump 12 in the system 11 is transmitted to the engine cooling water and is used for heating of the cabin.

A second branch passageway 43 is provided, which is connected to the first passageway 33 so as to bypass the radiator 34 and the thermostat valve 35. In other words, the bypass passageway 43 is connected in parallel to the radiator 34 and the thermostat valve 35 between a location of the passageway 33 upstream of the inlet of the radiator 34 and a location of the passageway 33 downstream of the outlet of the thermostat valve 35.

A variable throttle valve 40 is arranged in the fluid pressure operating system 11 between the outlet of the heat exchanger 39 and the inlet of the metering orifice 13. The valve 40 is provided with an actuating member 40-1 for causing the valve 40 to be switched between a normal position where throttling is not done and a throttling position where throttling by an orifice 40-2 is done. The actuating member 40-1 is connected to a manually operated controller 41 for making an adjustment of the degree of throttling by means of the orifice 40-2.

In more detail, under a condition that an amount of the operating fluid discharged from the oil pump 12 is small or the pressure of the operating fluid discharged from the oil pump 12 is low due to low rotating speed of the internal combustion engine 21, the manual controller 41 is adjusted so that the degree of the throttling by the variable throttle valve 40 is increased, which causes the outlet pressure of the operating fluid to be increased, thereby increasing the temperature of the operating fluid. Furthermore, the variable throttle valve 40 includes a pilot pressure chamber which is, via a pilot pressure passageway 42, opened to a location of the fluid pressure operating system 11 at the inlet to the power cylinder 20, so that the pressure of the operating fluid at the inlet of the power cylinder 20 is opened to the pilot pressure chamber of the variable throttle valve 40. Thus, an increase in pressure at the inlet to the power cylinder 20 due to operation of the power cylinder 20 during a steering operation by the steering wheel 22 causes the degree of the throttling by the valve 40 to be reduced, i.e., the degree of opening of the valve 40 is increased, so that a rapid increase in the pressure of the operating fluid from the oil pump 12 is prevented.

Now, operation of the heating device for a vehicle according to the present invention will be explained. Transmission of a rotating movement from the engine 21 to the oil pump 12 causes the operating fluid to issue to the fluid pressure operating system 11 at an increased pressure. A steering movement applied to the steering wheel 22 causes the control valve 18 to be operated, so that a supply of the operating fluid in accordance with the operating speed of the steering wheel 22 is directed into chamber 20-1 or 20-2 in accordance with the direction of the movement of the steering wheel. As a result, a multiplication of the steering force is achieved.

Continuous operation of the oil pump 12 is usually done so that the steering operation can be made at any time after the start of the internal combustion engine. The compression of the operating fluid by the oil pump 12 causes heat to be generated due to adiabatic compression as well as friction heat generated at a sliding portion in the oil pump 12, which causes the temperature of the operating fluid from the oil pump 12 to be increased. The heat exchanger 39 has a portion 39-1 located in the recirculating passageway 33 at a position between the outlet of the oil pump 12 and the inlet to the power cylinder 20, and functions to prevent the temperature of the operating fluid from increasing. Furthermore, the heat exchanger has a portion 39-2 in the portion 39-1, which portion 39-2 is located in the recirculating passageway 36 branched from the passageway 33 at a location upstream from the inlet to the heater core 37. As a result of this structure, in the heat exchanger 39, heat exchange occurs between the operating fluid and the engine cooling water. In other words, heat from the operating fluid is transmitted to the engine cooling water, thereby cooling the operating fluid, while the engine cooling water is subjected to heating.

When the temperature of the cooling water passing through the internal combustion engine 21 is low, i.e., when a cold engine has just been started in winter, the thermostat valve 35 adjacent the radiator 34 is in a closed condition, so that a supply of the engine cooling water to the engine 21 is stopped. Under this condition, a heating switch (not shown) is operated by a driver or a passenger when heating of the cabin is required; the water valve 38 is moved to an opened condition, where the engine cooling water from the internal combustion engine 21 which is subjected to a heating at the heat exchanger 39 is recirculated mainly through the heater core 37. Furthermore, a flow of air generated by a blower (not shown) is generated so as to contact the surface of the heater core 37, which causes a heat exchange to occur between the engine cooling water and the air, resulting in heating of the air contacting the heat exchanger. The heated air is discharged into the cabin, thereby heating the cabin. As a result, the heat generated at the oil pump 12 in the fluid operation system 11 can be effectively used for heating the cabin.

On the other hand, when a heating of the cabin is not required, the heating control switch turned off, which causes the water valve 38 to be moved to a closed position, where the engine cooling water from the internal combustion engine 21 is prevented from being fed to the heater core 37. As a result, heat exchange between the engine cooling water and air discharged into the cabin does not occur, thereby preventing the cabin from being excessively heated.

Furthermore, when the temperature of the engine cooling water is higher than a predetermined value, the thermostat valve 35 located adjacent the radiator 34 assumes an opened condition. As a result, flow of the engine cooling water from the engine 21 passes through the radiator 34. In other words, cooling of the engine cooling water occurs at the radiator 34, and the cooled engine cooling water is re-introduced into the engine, thereby cooling the engine.

Furthermore, manual manipulation of the controller 41 is done to reduce the degree of opening of the orifice 40-2 of the valve 40 when the rotating speed of the oil pump 12 is low due to a low rotational speed of the engine 21. Such a throttling operation of the valve 40 causes the pressure of the operating fluid from the oil pump 12 to be increased, thereby increasing the work to be done by the oil pump 12, resulting in an increase in the temperature of the operating fluid issued from the oil pump 12. Thus, an increase in temperature is obtained, which is subjected to a heat exchange with the engine cooling water at the heat exchanger 39, thereby increasing the temperature of the air, thereby causing the heating operation of the cabin to be carried out at an increased efficiency.

Advantages of the construction of the above explained embodiment will now be explained.

(a) First, in the heating device for a vehicle in the first embodiment, the heat exchanger 39 is arranged in a passageway for cooling water of the internal combustion engine 21 for the vehicle rather than the cabin of the vehicle. Thus, the construction of the fluid pressure operating system 11 is simplified. By this arrangement, a direct transmission of the pulsation of the pressure of the operating fluid generated by the compression operation of the oil pump 12 by way of the fluid pressure operating system 11 to the cabin does not occur. Furthermore, such a pulsation of the pressure of the operating fluid is effectively dampened at the cooling water recirculating passageway 33. Thus, a noise in the cabin is effectively suppressed, which makes the device preferable for use as a heating device of a passenger car where a highly reduced noise level in the cabin is strongly required.

(b) In this embodiment of the present invention, the heat exchanger 39 is arranged in the fluid pressure operating system 11 at a location between the outlet of the oil pump 12 and the power cylinder 20. As a result of this arrangement the operating fluid discharged from the oil pump 12 is subjected to cooling at the heat exchanger 39, prior to a supply of the operating fluid to the power cylinder 20. Thus, the power cylinder 20 is fed by the operating fluid at a reduced temperature. In other words, the power cylinder 20 is prevented from being subjected to a severe condition caused by a high temperature and a high pressure of the operation fluid fed to the power cylinder 20, thereby obtaining an increased durability.

(c) In the heating device of the first embodiment, a heat exchange of the operating fluid in the fluid pressure operating system 11 to the cooling water in the engine cooling water recirculating passageway occurs, so that the heat of the operating fluid is used for the heating of the cabin. In other words, an increased heating performance is obtained by using heat of the operating fluid in the operating fluid recirculating system 11, which was heretofore discarded, while using a very simplified structure wherein the heat exchanger 39 is merely added to the heating device of a conventional type for a cabin using, as a heat source, the heat of the engine cooling water. In particular, a quick increase in the temperature of the engine cooling water is obtained when a cold engine is started during a condition of a low ambient temperature such as in the winter season, which, on one hand, allows atmospheric temperature in the cabin to be quickly increased, and a warming-up speed of the engine 21 to be increased, on the other hand.

Furthermore, even in the case where the present invention is applied to an existing vehicle, a mere arrangement of the heat exchanger at a location between the fluid pressure operating system 11 and the engine cooling recirculating passageway 13 is sufficient for obtaining increased heating performance.

(d) In the heating device for a cabin in the first embodiment of the present invention, the heat exchanger 39 is arranged in the fluid pressure operating system 11 is located between the outlet of the oil pump 12 and the metering orifice 13. As a result, a reduction of the temperature of the operating fluid is less likely, than in the case in a structure where the heat exchanger is arranged at a location downstream of the metering orifice 13, due to a reduction of the temperature of the operating fluid due to adiabatic expansion which occurs when the operating fluid is passed through the metering orifice 13. Thus, in the structure of the present invention, a reduction of heat exchange efficiency at the heat exchanger is prevented, so that more effective hat exchange can be obtained between the operating fluid and the engine cooling water.

(e) In the heating device for a vehicle according to an embodiment of the present invention, the heat exchanger 39 is arranged in the branched passageway 36 which is connected to the engine cooling water recirculating passageway 33 in parallel with respect to the radiator 34 at a location adjacent to the inlet of the engine cooling water to the heater core 37. In this case, at a low temperature of the engine cooling water upon the start of the engine 21, the thermostat valve 35 in the engine cooling water recirculating passageway 33 at an outlet of the radiator 34 is closed, thereby stopping recirculation of the engine cooling water through the radiator 34. As a result, the engine cooling water only flows through the branched passageway 36, which causes the engine cooling water to be heated at the heat exchanger 39. Thus, the heated engine cooling water is subjected to an effective heat exchange with air at the heater core 37 which is arranged substantially in series with respect to the heat exchanger 39, which results in a quick start up of the heating operation of the cabin.

Furthermore, in the first embodiment, the cooling water is recirculated to the engine 21, while keeping the heat generated by the heat exchange at the heater core 37, which services to increase a warming up performance of the engine 21. Thus, an increase in the temperature of the engine cooling water is faster and heating of the cabin is quicker.

(f) In this embodiment of the heating device of the cabin, the variable throttle valve 40 is arranged at the outlet of the heat exchanger 39 in the operating fluid pressure operating system 11. As a result, during a condition of low output pressure from the oil pump 12, control for reducing the degree of throttling of the variable throttle valve 40 is done for increasing the discharge pressure of the operating fluid, thereby increasing the temperature of the operating fluid. As a result, an increase in the temperature of the engine cooling water is obtained at the heat exchanger 39, thereby increasing the heating performance.

(g) In the vehicle heating device in the embodiment as explained, the pressure at the inlet of the power cylinder 20 as a pilot pressure is opened to the spring chamber of the variable throttle valve 40 via a pilot pressure feed passageway 42. Thus, during operation of the power cylinder 20, the degree of the opening of the variable throttle valve 30 is increased, so that, on one hand, a desired amount of the operating fluid is maintained, and a rapid increase in the pressure at the oil pump 12 is prevented.

(h) In the vehicle heating device in the embodiment as explained, the oil pump 12 is the one for operating the power steering device. Thus, the metering orifice 13, the flow control valve 14 and the pressure control valve 15 are incorporated into the body 23 of the oil pump 12, so that the construction of the peripheral devices for the oil pump are small and the devices are suitable for installation into a limited space in an engine compartment of the vehicle.

Second Embodiment

Figure 5:
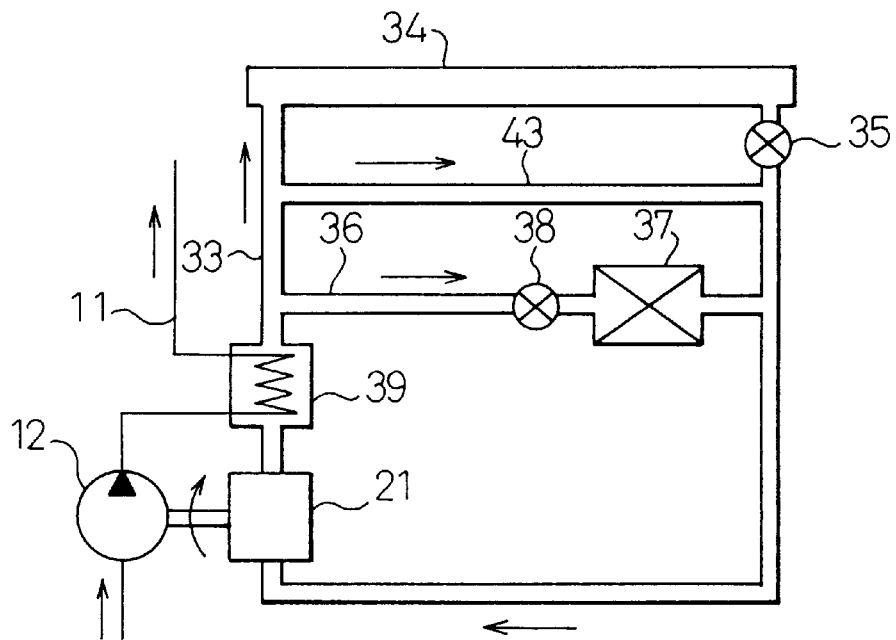
FIG. 5 is a schematic partial view of the system according to a second embodiment of the present invention.

A second embodiment of the present invention will now be explained with reference to FIG. 5. Namely, in the second embodiment, the heat exchanger 39, which is located in the fluid pressure operating system 11 between the outlet of the oil pump 12 and the power cylinder 20, is arranged so that a heat exchange occurs with respect to the engine cooling water in the engine cooling water recirculating passageway 33 at a location adjacent the outlet of the engine 21. As a result, the advantages of the first embodiment can also be obtained in this second embodiment.

In the operation of the second embodiment, in a situation where the engine 21 is fully warmed up and the heating of the cabin of the vehicle is possible by the heat of the engine applied to the engine cooling water, the thermostat valve 35 is opened, so that a part of the engine cooling water is recirculated to the radiator 34. As a result, the excessive heat applied to the engine cooling water by the engine 21 and the heat exchanger 39 is emitted at the radiator 34. Thus, an excessive heat exchange of the engine cooling water with respect to the air flow as discharged to the cabin does not take place, thereby preventing the cabin being subjected to an excessive heating condition.

Furthermore, in the heating device of a cabin of a vehicle in the second embodiment, where the engine cooling water is recirculated to the radiator 34 due to the opened condition of the thermostat valve 35, the heat transmitted from the operating fluid to the engine cooling water at the heat exchanger 39 is emitted or cooled at the radiator 34. As a result, even at a condition that the heater core 37 is not operating due to a closed condition of the water valve 38, the operating fluid in the fluid pressure operating system 11 is subjected to a cooling at the heat exchanger 39 prior to the supply to the power cylinder 20. Thus, the power cylinder 20 is prevented from being fed with operating fluid at a high temperature, thereby preventing the power cylinder 20 from being subjected to a severely heated condition.

Third Embodiment

Figure 6:
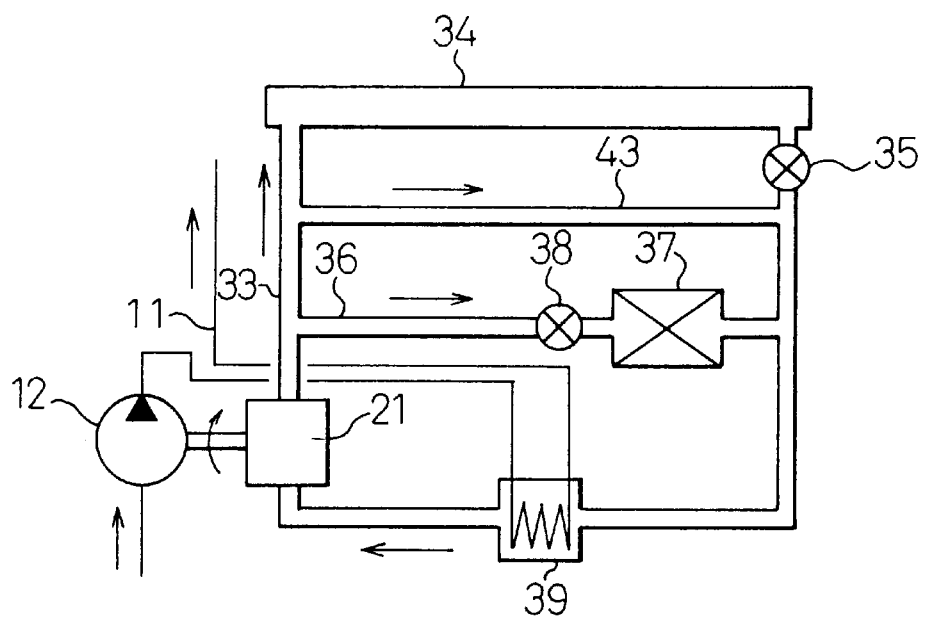
FIG. 6 is a schematic partial view of the system according to a third embodiment of the present invention.

Now, a third embodiment of the present invention will be explained with reference to FIG. 6. In the third embodiment, the heat exchanger 39 is located in the engine cooling water recirculating passageway 33 at a location adjacent the inlet of the engine 21. In this third embodiment, under a low temperature condition of the engine cooling water when a cold engine is started, the thermostat valve 35 in the first branch passageway 33 is also in a closed condition, which prevents, on one hand, engine cooling water from being recirculated through the radiator 34 and the recirculation of the engine cooling water occurs through the recirculating passageway 36, on the other hand. As a result, heat exchange occurs at the heat exchanger 39 between the engine cooling water in the first branch passageway 33 and the operating fluid in the operating fluid recirculating circuit 11, so that the cooling water is heated at the heat exchanger 39 and returned to the engine 21. Thus, the speed of warming up of the engine is increased, which causes the heating of the cabin to be quick.

In this third embodiment, as in the second embodiment, the opening of the thermostat 35 causes the cooling water to be recirculated in the radiator 34, so that the heat transported to the engine cooling water from the operating fluid at the heat exchanger 39 is subjected to a cooling at the radiator 34. Thus, even in the condition where the heater core 37 of the heating device is not operating due to a closed condition of the water valve 38, the operating fluid in the fluid pressure operating system 11 is subjected to an effective cooling prior to feeding the operating fluid to the power cylinder 20. As a result, the power cylinder 20 is prevented from being fed by a high temperature operating fluid, thereby preventing the power cylinder from being subjected to a severe heat condition.

Fourth Embodiment

Figure 7:
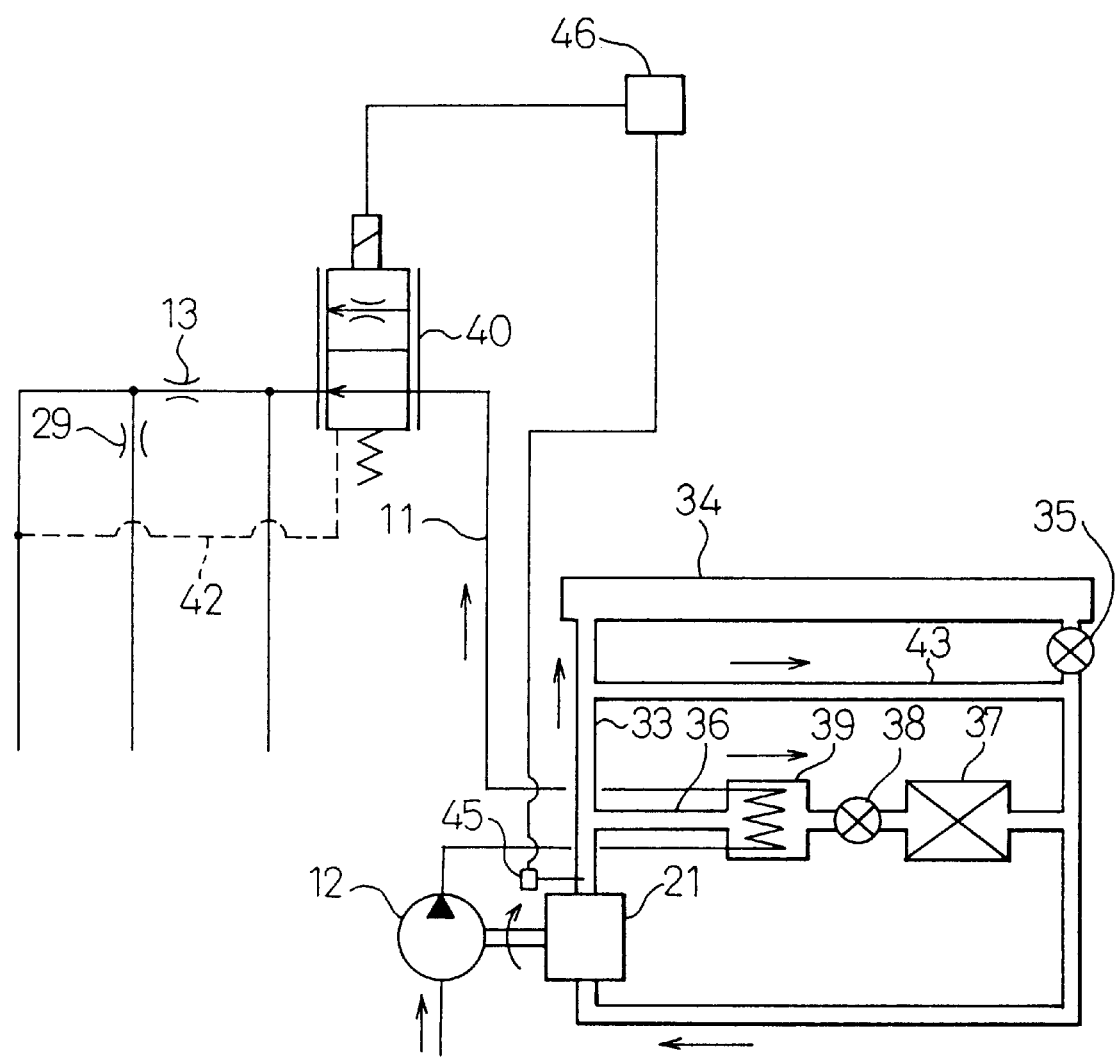
FIG. 7 is a schematic view of the system according to a second embodiment of the present invention.

Now, a fourth embodiment of the present invention will be explained with reference to FIG. 7. The embodiment in FIG. 7 is directed to detection of the temperature of the engine cooling water by means of a temperature sensor 45 arranged in the engine cooling water recirculating passageway 33 at a location adjacent the outlet of the engine 21 and control of the degree of the opening of the variable throttle valve 40 in accordance with the temperature detected by the sensor 45. Thus, an automatic control of the degree of the opening of the variable throttle valve 40 in accordance with the temperature of the engine cooling water is realized, which causes the outlet pressure of the operating fluid to be varied, thereby increasing the temperature of the operating fluid. When a sufficient increase in the temperature of the engine cooling water is obtained, which is sufficient for making the heat exchanger 39 unnecessary, an automatic control of the increase in the degree of the opening of the variable throttle valve 40 is effected. Thus, the engine cooling water is prevented from being subjected to an excessive temperature increase, while the oil pump 12 is prevented from being subjected to an unnecessarily increased load.

Modifications

The present invention can be embodied while being modified as listed herein below.

(1) In the first and fourth embodiments, the degree of the opening of the variable throttle valve 40 is continuously controlled.

(2) In the first and fourth embodiments, the variable throttle valve 40 is arranged in the fluid pressure operating system 11 at an inlet of the operating fluid to the heat exchanger 39.

(3) In the fourth embodiment, the temperature sensor 45 is arranged to detect the temperature of the engine cooling water in the recirculating passageway 33 at an inlet of the engine 21.

(4) In the first embodiment, the variable throttle valve 40 and a manual controller 41 are eliminated.

These modifications can attain effects almost comparable with those in the above first to fourth embodiments.

We claim:

1. A heating apparatus for a vehicle, having an engine, comprising:

an internal combustion engine;

a fluid pressure operating system including an oil pump operated by the engine for discharging an operating fluid and an actuator for receiving the operating fluid from the oil pump for operating said actuator;

an engine cooling water recirculating passageway for a recirculation of the engine cooling water;

a radiator arranged in said engine cooling water recirculating passageway for emission of heat in the engine cooling water;

a first passageway branched from said engine cooling water recirculating passageway so as to by-pass the radiator;

a heater core arranged in said first branched passageway so that a heat exchange occurs between the engine cooling water and an air flow to be discharged into a cabin of the vehicle, and;

a heat exchanger arranged in the operating fluid recirculating passageway at a location between an outlet of said oil pump and said actuator in such a manner that a heat exchange occurs between the operating fluid and the engine cooling water, thereby causing the heat generated in the operating fluid to be transmitted to the engine cooling water and to be used for heating the cabin.

2. A vehicle according to claim 1, further comprising a fixed throttle arranged in said fluid pressure system at a location between the outlet side of the oil pump and said actuator, said heat exchanger being arranged between the outlet of the oil pump and the said fixed throttle.

3. A vehicle according to claim 1, comprising a second passageway branched from said engine cooling water passageway, a thermostat valve arranged in the engine cooling water recirculating passageway for blocking a flow of the engine cooling water to the radiator when the temperature of the cooling water is lower than a predetermined value and an on-off valve in said first branched passageway for selectively opening or closing the branched passageway in accordance with the heating requirement of the cabin, and wherein said heat exchanger is arranged so as to by-pass the recirculating passageway between the branching point of the first passageway and the radiator.

4. A vehicle according to claim 3, wherein said heat exchanger is arranged in said first branched passageway at an inlet of said heater core.

5. A vehicle according to claim 3, wherein said heat exchanger is arranged in said engine cooling water recirculating passageway at a location adjacent to the outlet of the engine cooling water from the engine.

6. A vehicle according to claim 3, wherein said heat exchanger is arranged in the recirculating passageway at a location adjacent to the inlet of the engine cooling water to the engine.

7. A vehicle according to claim 1, further comprising a variable orifice arranged in the operating fluid of said recirculating passageway.

8. A vehicle according to claim 7, further comprising a temperature sensor for detecting the temperature of the engine cooling water and a controlling means for controlling the degree of the opening of said variable orifice.

9. A vehicle according to claim 7, further comprising a means for allowing, as a pilot pressure, the pressure at the inlet of the actuator to be introduced into the variable orifice.

10. A vehicle according to claim 1, wherein the vehicle is provided with a power steering device and said oil pump is an oil pump for operating said power steering device.

* * * * *